Jan. 10, 1939.   H. F. B. HÖGFORS   2,143,599
CASH REGISTER, ADDING, AND OTHER CALCULATING AND ACCOUNTING MACHINE
Filed Sept. 30, 1935   6 Sheets-Sheet 5

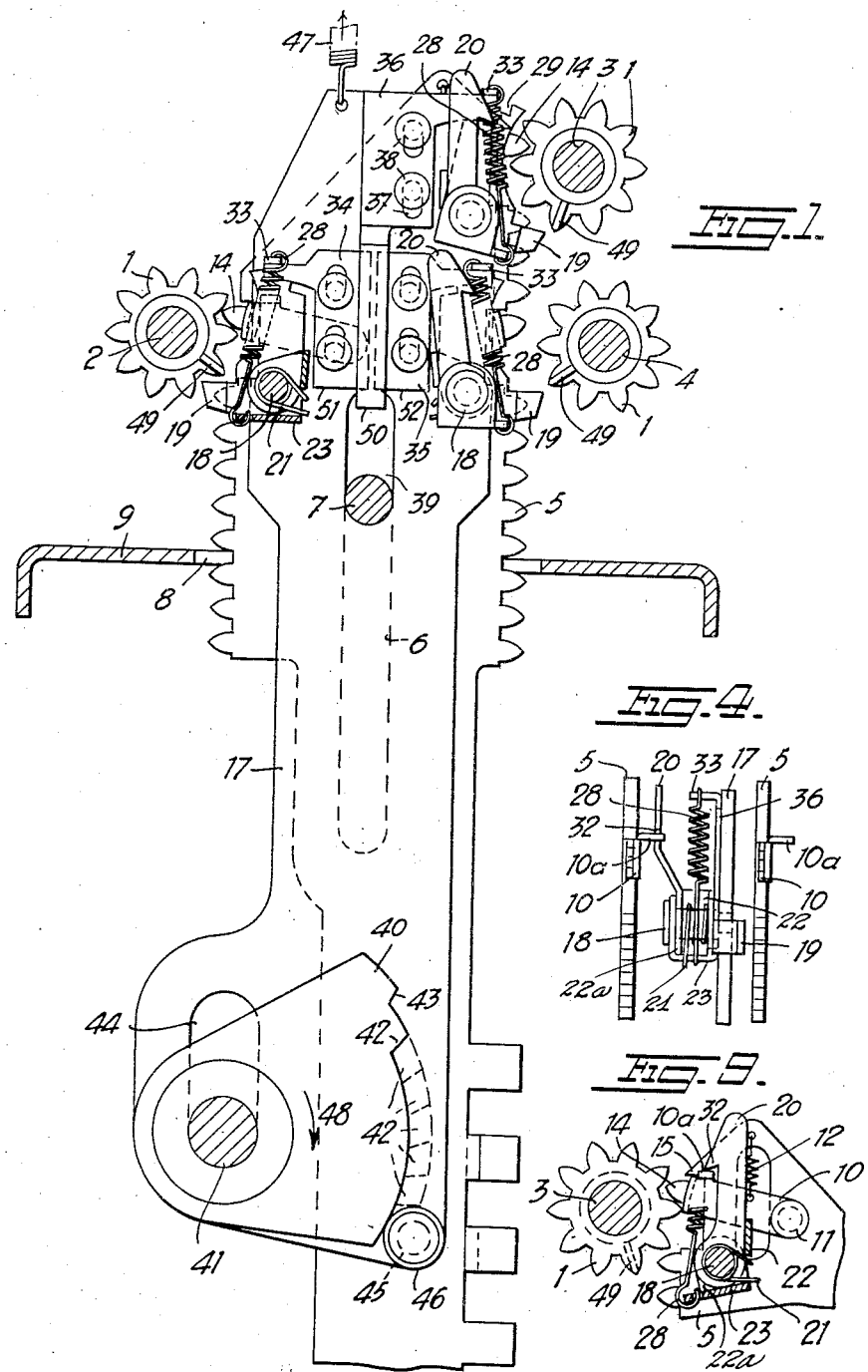

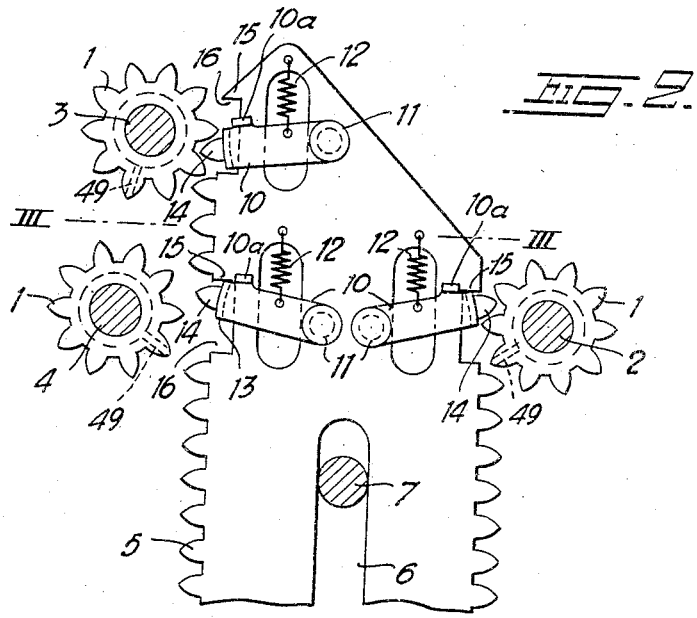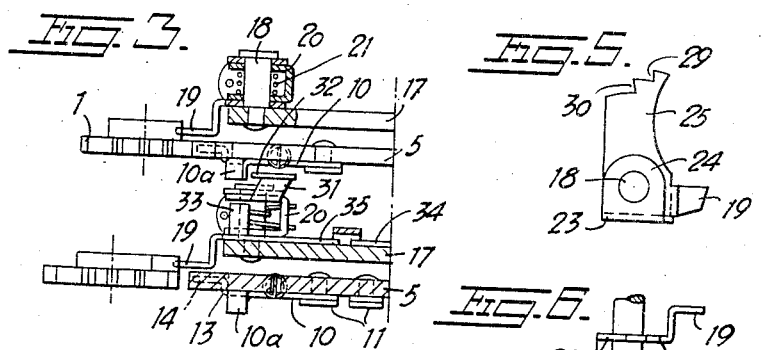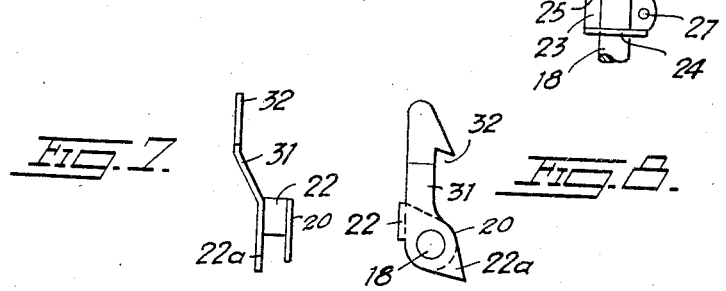

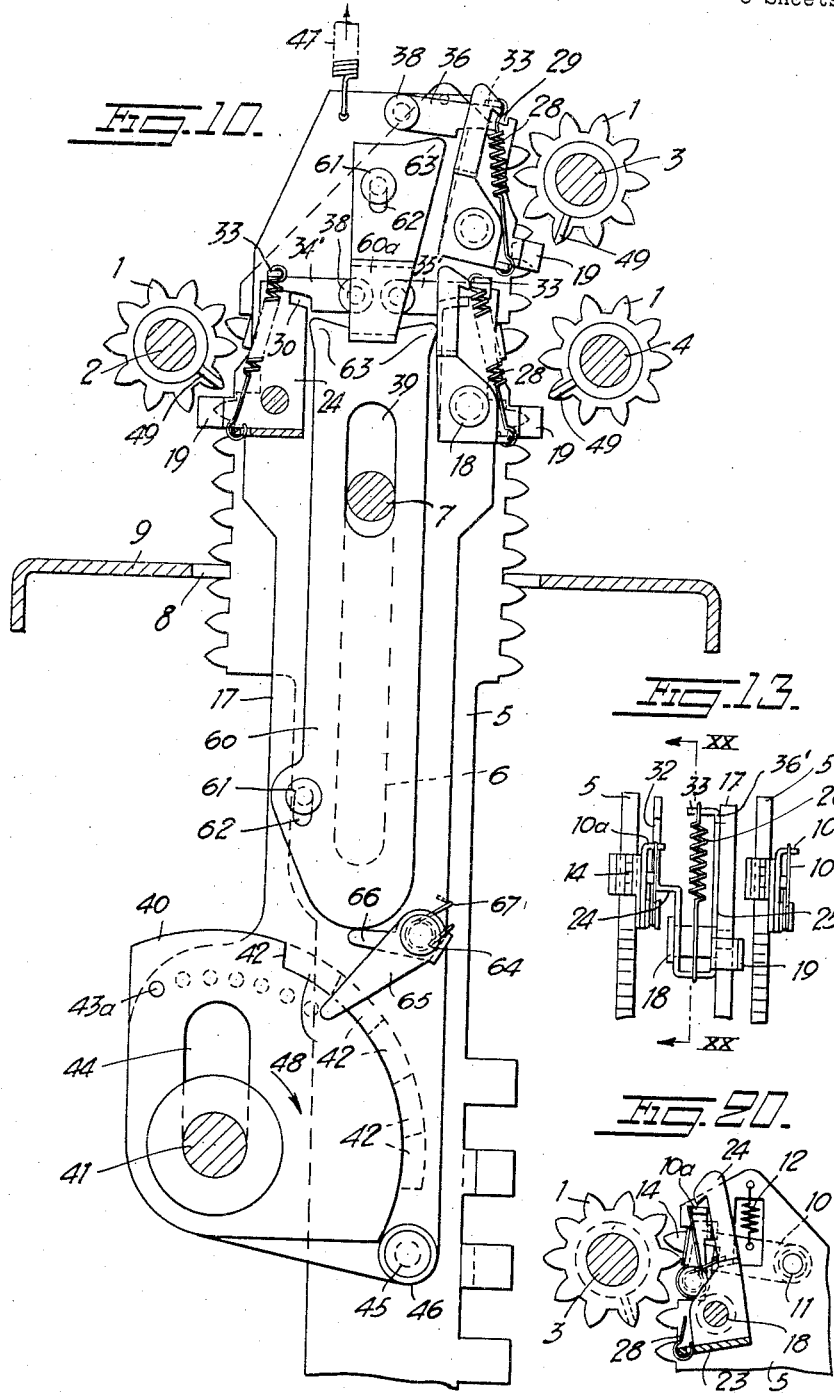

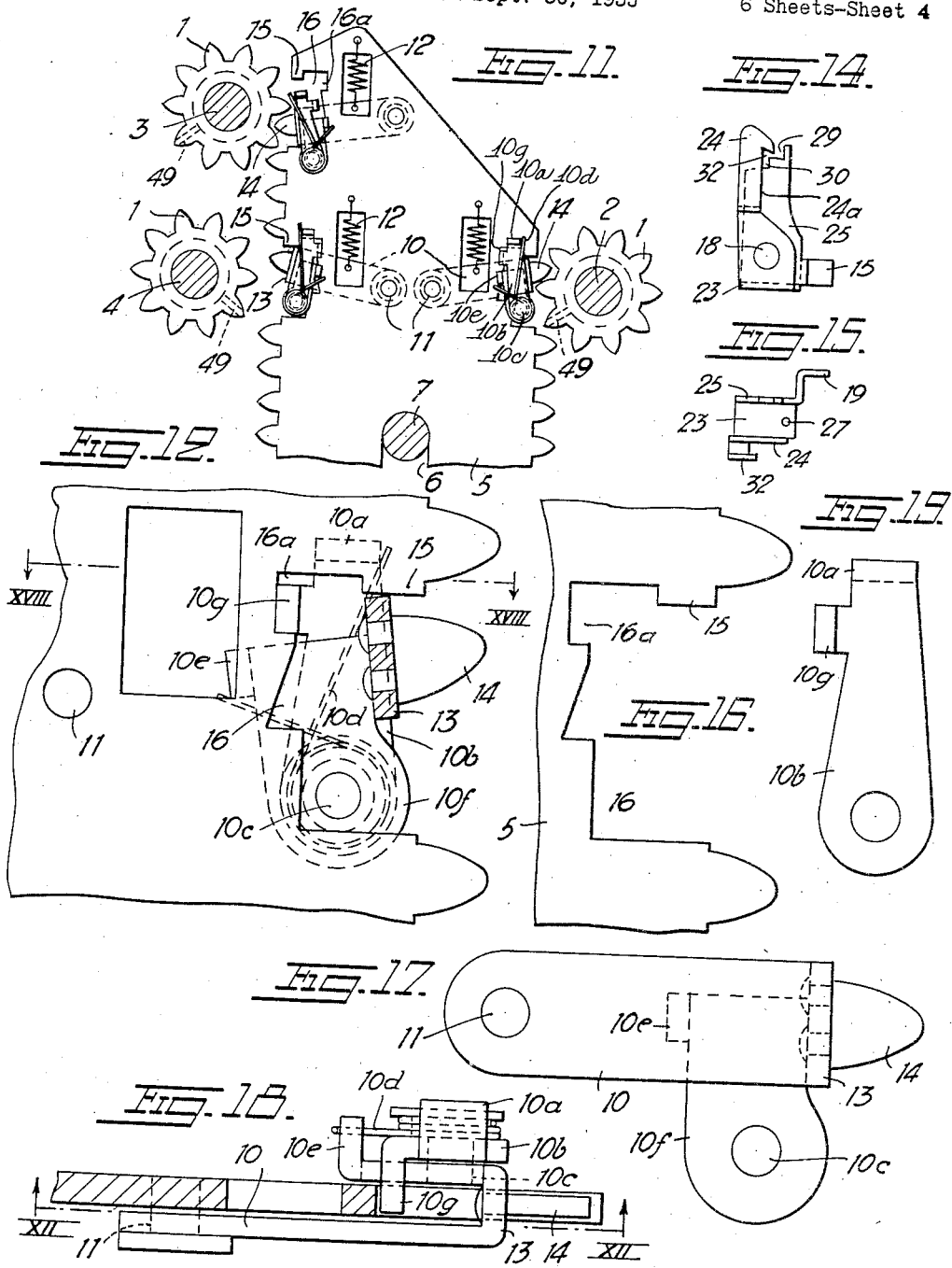

Fig. 21.

Inventor
Hans F. B. Högfors
By Summers & Young
Attys

Jan. 10, 1939.   H. F. B. HÖGFORS   2,143,599
CASH REGISTER, ADDING, AND OTHER CALCULATING AND ACCOUNTING MACHINE
Filed Sept. 30, 1935   6 Sheets-Sheet 6
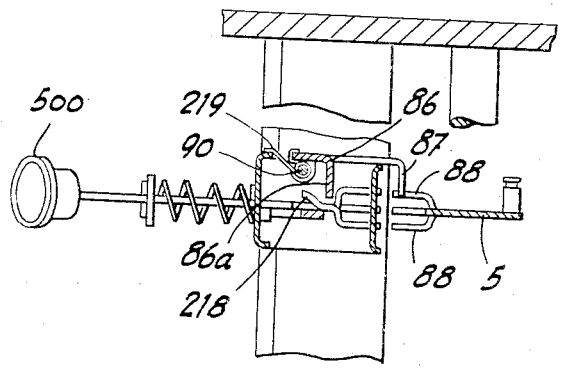
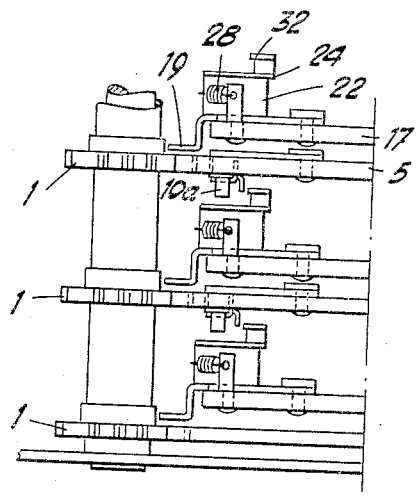
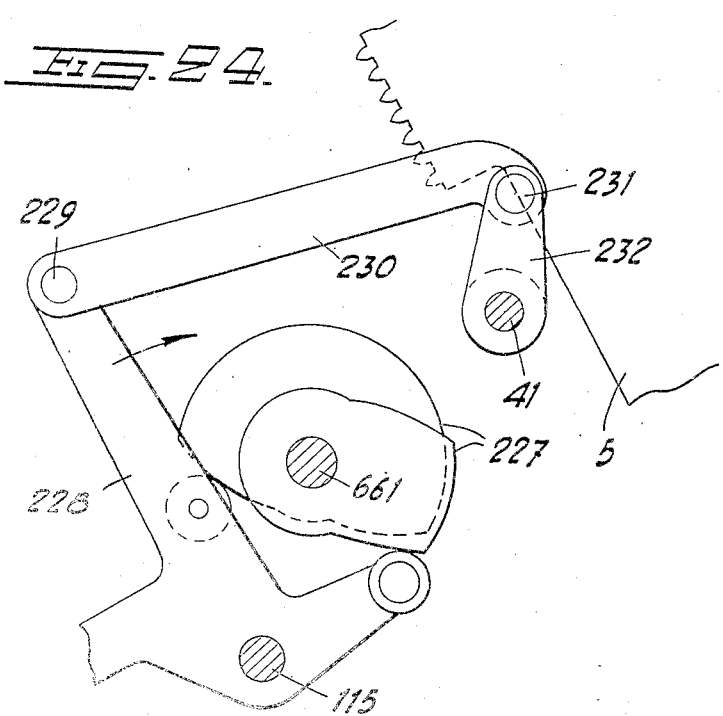
Inventor
Hans F. B. Hogfors
By Sommers & Young
Attys Patented Jan. 10, 1939

2,143,599

UNITED STATES PATENT OFFICE 2,143,599

CASH REGISTER, ADDING, AND OTHER CALCULATING AND ACCOUNTING MACHINE

Hans Fredrik Birger Högfors, Enskede, near Stockholm, Sweden

Application September 30, 1935, Serial No. 42,954
In Sweden October 4, 1934

14 Claims. (Cl. 235—138)

In cash registers, adding and other calculating machines it is well-known to use setting members in the shape of straight racks, adapted to turn the wheels of a totalizer a number of teeth corresponding to the setting. If the racks may be moved nine steps at most, particular racks displaceable on the setting racks are generally used for carrying the tens by turning the totalizer wheels one step forward. The tens are then carried either by means of springs, while the racks are moving, or positively, after the racks have been restored to their zero position. If several totalizers are placed along the same setting racks to be actuated by them, each totalizer must have its separate set of such racks; and for this reason the distance between two adjacent totalizers must be at least ten pitches, which renders the machine big and bulky. This also applies to those cases in which the setting members consist of rack sectors or segments and similar elements are used for carrying the tens. The slidable racks are difficult to manufacture and for this reason it is desirable to use fixed teeth on the setting members.

A chief purpose of this invention is to use such fixed teeth on the setting members, while simultaneously securing the advantage that the totalizer wheels remain in mesh during the carrying of the tens and consequently cannot move more than one step at each tens transfer. Such advantage could heretofore be secured by means of displaceable tens carrier racks only.

Another object of this invention is to arrange two or more totalizers, whose numeral wheels may be coupled to the setting members—via intermediate wheels or not—at the same side of the setting member (i. e. at the same row of teeth of the setting member) at a shorter distance from each other than nine pitches of the setting member (in a decimal system).

Another object is to cut away two teeth of each setting rack and to replace them by a single movable tooth.

Another object of this invention is to provide locking means for such movable tooth to use the same both for tens transfer and for resetting operations.

Another object of this invention is to render a very compact construction of the machine possible.

Another object of this invention is to render it possible to arrange the tens transfer initiating arms for several totalizers on one and the same tens transfer member.

Another object of this invention is to render the carrying mechanism less complicated and bulky, to construct the same with fewer parts and to render it less expensive in manufacturing cost and more safe and reliable in operation than heretofore.

Other objects of the invention will be evident from the annexed specification and claims.

The carrying mechanism in accordance with this invention may be applied both to decimal systems, such as U. S. coinage, and to non-decimal systems, for instance, duodecimal and vigesimal systems, such as British coinage. For this reason the terms "tens carrying" and "tens transfer" in the specification and claims should be interpreted in its broadest sense to cover also the carrying of units to higher denominations, both in decimal and non-decimal systems.

For the sake of brevity and simplicity the following specification describes and the drawings illustrate substantially such parts only as are directly connected with the carrying mechanism. The other parts of the machine may be of any well-known construction suitable for the purpose. If this invention is applied in particular to cash registers, such other parts may, for instance, be constructed as set forth in U. S. Patents 1,879,245 to H. F. B. Högfors, 1,967,531 and 1,979,387 to H. F. B. Högfors, assignor, to Kooperativa Förbundet förening u. p. a., 1,205,298 to Werner, assignor to National Cash Register Co., 1,181,238 to Martin, and British Patents No. 244,601, 270,350 and 285,500.

Two embodiments of the invention are shown by way of example in the annexed drawings. Fig. 1 shows a vertical section at right angles to the totalizer shaft through a part of a cash register with three groups of totalizers, part of the initiating mechanism for the tens carrying being shown in section for the left-hand totalizer. Fig. 2 shows a part of the same section, seen from the opposite direction. Fig. 3 shows, in its uppermost portion, part of the mechanism seen from above, partially in section through the shaft of an initiating arm, and, in its lowermost portion, a section on the line III—III in Fig. 2, after the spring 28 between the initiating arm and the catch has been removed. Fig. 4 shows a partial view seen from the right in Fig. 1, after the totalizer wheels have been removed. Figs. 5 and 6 show an end view and a plan view of an initiating arm. Figs. 7 and 8 show an elevation and an end view of a carrying arm. Fig. 9 shows a section through the tens carrying mechanism of the upper right hand totalizer of Fig. 1 seen from the opposite side, said mechanism being in its initiated position.

Fig. 10 shows a vertical section, analogous to Fig. 1, through another embodiment. Fig. 11 shows a part of the same section seen from the opposite side. Fig. 12 shows, on a larger scale, a detail of Fig. 10, in a section on the line XII—XII in Fig. 18. Fig. 13 shows a part of a view from the right in Fig. 10, after the numeral wheels have been cut away. Figs. 14 and 15 show an end view and a plan view of an initiating arm. Fig. 16 shows the same view as Fig. 12 after the tooth-carrying arm and its locking arm have been removed; thus Fig. 16 shows the shape of the recess made at the two fixed teeth cut away on the setting member. Fig. 17 shows a side view of the tooth-carrying arm of Fig. 12. Fig. 18 shows a section on the line XVIII—XVIII in Fig. 12. Fig. 19 shows a side view of the locking arm in Fig. 12. Fig. 20 is a section on the line XX—XX in Fig. 13 and shows a section through the tens carrying mechanism in its initiated position, at the upper right-hand totalizer of Fig. 10, seen from the opposite side. Figs. 12, and 17-19 are on a larger scale.

Fig. 21 shows a partial cross-section through the machine on a smaller scale. Fig. 22 shows a section on the line XXII—XXII in Fig. 21. Fig. 23 shows a plan of the left-hand totalizer in Fig. 10 with its setting members and tens carrying mechanism.

Fig. 24 shows a detail.

As is usual in machines of this type, the tens carrying mechanisms for all denominations (except the units) are identical. For the sake of simplicity, most of the figures of the drawings only show the mechanism for one denomination, the same mechanism for the other denominations (except the lowest one) being a mere duplicate thereof.

To render the figures simpler, one single totalizer is shown in each of the three groups, but the invention may be applied also if each group of totalizers has several totalizers on the same shaft, this being, for instance, the case in cash registers for four assistants and four business transactions, having their respective totalizers. Then four totalizers for the assistants are arranged on the shaft 4 and four totalizers for the transactions on the shaft 3. The totalizers are brought into operation in well-known manner by displacing the totalizer shafts, so as to bring the wheels of the totalizers to register with the setting members 5.

Referring now to Figs. 1–9 of the drawings, 1 indicates the totalizer wheels. In the three totalizers shown said wheels are rotatable on the shafts 2, 3, 4 and each totalizer wheel registers with the corresponding setting rack 5, whose teeth are to actuate the wheel 1. All the three totalizer wheels shown are actuated from the setting rack 5 illustrated. Said racks have slots 6 through which a shaft 7 extends to guide the racks in their longitudinal direction. In their transverse direction they are guided in slots 8 of the guiding plate 9.

On said racks 5 tooth-carrying arms 10, one for each group of totalizers, are rotatably journalled on pins 11 and normally pressed upwards by springs 12 to cause their bent portions 13 carrying the teeth 14 proper to engage the upper edges 15 of recesses or cut-away portions 16 of each setting rack. In addition each arm 10 is provided with an offset 10a. For each totalizer wheel those two teeth are cut away in the corresponding row of teeth of the rack 5 which in the position of rest (zero position) of the rack would be on both sides of that tooth of the corresponding totalizer wheel whose centre line is at right angles to the pitch line of said row of teeth. In other words, said tooth of the totalizer wheel is the tooth which in the zero position of the rack is next to and just in front of the rack. It is to be observed that at least two teeth of the rack are normally meshing with each of the totalizer wheels 1. When the cut-away portion 16 passes by the wheel 1, only the single tooth 14 meshes in a certain moment with the corresponding wheel 1 but also then the rack 5 and each wheel 1 then in operative position are still positively in mesh so that each one-pitch-motion of the rack 5 also positively causes each totalizer wheel then in operative position to be moved one step.

At each setting rack, except the units rack, a tens carrier slide 17 is displaceably arranged. To the slide 17 pins 18 are secured carrying initiating arms 19 and carrying arms 20. Around the pins 18 torsional springs 21 are placed, of whose ends one engages the central part 22 of the carrying arm 20 and the other the central part 23 of the initiating arm 19. The initiating arms 19, see particularly Figs. 5 and 6, are in their central part 23 bent at right angles to form two walls 24, 25, each having one hole for the shaft 18. In the central part 23 a hole 27 is made for one end of a spring 28. The wall 25 is higher than the wall 24 and provided with two notches 29, 30. Similarly, the carrying arm 20 (Figs. 7 and 8) is bent twice and journalled on the pin 18. The wall 31 thus formed has a hook 32 and an offset 22a, the latter being pressed by the spring 21 to engage the central part 23 of the initiating arm 19, Figs. 2 and 9.

The initiating arms 19 are kept in their normal position by the springs 28, one end of which is attached to the holes 27. The other ends of said springs are secured to offsets 33 of three catches 34, 35, 36, one for each initiating arm 19, i. e. one for each totalizer wheel. Said catches have slots 37, through which the pins 38 secured to the slides 17 extend to permit said catches to move in the longitudinal direction of the slide, and are normally engaged by the notches 29 of the initiating arms 19 and are retained therein by the springs 28, which thus simultaneously keep both the arms 19 and their catches 34, 35, 36 in position.

For guiding the slides 17 in their longitudinal motion slots 39 are cut in said slides through which the shaft 7 extends. In the transverse direction the slides are guided by corresponding enlarged portions of the recesses 8 in the guide plate 9. In its lower end each slide 17 is provided with a slot 44 through which a shaft 41 extends. In addition, the slides 17 are provided with pins 45 on which rollers 46 are journalled. The slides 17 are pressed upwards by springs 47, so that the lower ends of the slots 44 engage the lower side of the shaft 41 in the position of rest, as shown in Fig. 1. To the shaft 41 cams 40 are rigidly secured, one for each slide 17, each of said cams having a shoulder 42. The shoulders 42 are in well-known manner displaced a certain angle in relation to each other, as shown in Fig. 1. In addition, each cam 40 has a shoulder 43 after the last shoulder 42 as reckoned in the direction of the arrow 48. The shoulders 43 register with each other and are not angularly displaced. The cams 40 are one less than the number of wheels of a totalizer. In the drawings, there are six cams 40, and consequently the totalizer has seven wheels, i. e. a maximum capacity of 99,999;99. To the shaft 41, to which the cams 40 are secured, an arm 232, Figs. 21, 24 is also rigidly secured. By means of pivots and links 231, 230, 229, 228 the shaft 41 is rocked to and fro by cams 227 on a main shaft 661 of the machine, to effect tens carrying operations. The main shaft 661 is rotated in well-known manner by a motor or manually. Thus, the cams 40 are rocked, first in the direction of the arrow 48 and then back to the position of rest.

The lower edges 50, 51, 52 of the catches 34, 35, 36 register with the upper end of the slot 39, when said catches are in their uppermost position on the slide 17. If said catches are drawn downwards, their edges 50, 51, 52 are below the upper end of the slot 39, as shown for the catch 36 (edge 50) in Fig. 1.

The device described acts as follows:

The setting racks 5 are in well-known manner operated by means of keys 500, Figs. 21, 22. The keys 500 have oblique lugs 218, Fig. 22, which cooperate with setting rack releasers 86, one for each vertical row of keys. The releaser 86 is pivoted on a shaft 90 and has a bent-over part 86a and a projection 87. A torsional spring 219 tends to rock the releaser 86 in clockwise direction on the shaft 90, Fig. 22, so that the part 86a is engaged by the lugs 218 on the keys. If no key is depressed the projection 87 of the releaser is held just above the lowest one of a number of projections 88 of the corresponding setting rack 5. When a key 500 is depressed, the lug 218 rocks the rack releaser 86 in a counterclockwise direction, Fig. 22, so that the projection 87 is moved out of the path of motion of the projection 88, thus releasing the corresponding rack 5. At the operation of the machine said rack is then moved upwards by its lifting spring 89, Fig. 21, until the rack 5 is stopped, when one of its projections 88 strikes the key 500 depressed. Thus, the rack 5 is stopped in a position corresponding to the numerical value of the key depressed. During this motion of the rack 5 upwards the totalizer wheels are disengaged from said racks. When the racks have stopped, the wheels 1 are rocked into engagement with the racks 5 by means of a lever 501, which is rockably journalled on a stationary shaft 502 and carries a roller 503. A spring 504 serves to press the roller 503 against a cam 505 on the main shaft 661. A link 506 has one end pivoted at 507 to the lever 501 and its other end is pivoted at 508 to a slidable carriage 509, which carries the totalizer 2. For the totalizers 3 and 4 the arrangement is quite similar.

Now the totalizer, say 2, is in mesh with the rack 5, which is then restored to its position of rest by means of a restoration rod 112, Fig. 21, to which a reciprocating motion is imparted by cams 116 on the main shaft 661 via links 113, and levers 114 rotatably journalled on the stationary shaft 115. In addition, a pin 112a forming a joint between the link 113 and the lever 114, engages a lug 1142 on the rack 5, to move the latter downwards.

During its motion downwards to its lowermost position the rack 5 rotates the engaged totalizer wheel as many pitches forwards as is indicated by the numeral values of the respective keys depressed. If then a wheel 1 is rotated from the number "9" to the number "0", its tens carrying tooth 49 passes by the initiating arm 19, rocking it down to the position shown at the uppermost right-hand totalizer (at 3) of Fig. 1. Simultaneously the corresponding catch, in this case 36 (for the totalizer on the shaft 3) snaps into the notch 30 of the wall 25 with its offset 33 under the action of the spring 28 and retains the initiating arm 19 in its new position. When an initiating arm 19 is rocked also the corresponding carrying arm 20 follows under the action of the spring 21, whose hook 32 afterwards lies above the offset 10a of the rockable tooth-carrying arm 10, after the setting rack 5 has been returned to its zero position, as shown in Figs. 9 and 4. If a tens carrying is initiated while the setting rack is moving downwards the tens carrying arm 20 will have its hook 32 in the path of the offset 10a of the rockable tooth-carrying arm 10, but then the arm 20 yields while setting the spring 21, and the hook 32 again snaps in above the offset 10a, as soon as the latter has passed by. Thus the tens carrying is initiated by the rocking of the hooks 32 to their operative positions as a result of the action of the tens carrying tooth 49 on the arm 19, when a ten is to be carried. (In Fig. 1, a section through the arms 19, 20 is shown at the left totalizer; said arms rocked out to their operative position, i. e. initiated for carrying the tens, are shown at the upper right-hand totalizer and said arms in their normal position are shown at the lower right-hand totalizer.)

After the setting rack has stopped in its zero position, the machine continues running. Then the shaft 41 receives a rocking motion to and fro first in the direction of the arrow 48, by means of the above-mentioned device, not shown. Thus, the shoulders 42 of the cams 40 will successively engage the corresponding rollers 46 of the tens carrying slides 17, moving them separately downwards beginning with that which corresponds to the lowest denomination. In well-known manner the angle between the shoulders 42 is chosen so that a slide 17 of a higher denomination does not begin to move, until after the slide of the next lower denomination has completed its displacement under the action of the corresponding cam 42.

If now a tens transfer has been initiated and consequently a carrying arm 20 has been moved with its hook 32 to its carrying position, as described above, the hook 32 will, during the downward motion of the slide 17, engage the upper edge of the offset 10a of the arm 19 to push said arm one pitch downwards. Then the tooth 14 of said arm rotates the wheel 1 one step forwards, thus completing the tens transfer. If during such transfer a tens transfer should be initiated on the numeral wheel of the next higher denomination, it is obvious from the foregoing description that this is quite possible, because the hook 32 of the carrying arm 20 is then moved inwards directly above the upper side of the offset 10a of the rack of the next higher denomination, so that said offset 10a by the tens transfer slide 17 of the next higher denomination is pushed downwards, when said slide afterwards moves downwards. After all the tens have been carried, the totalizers are disengaged.

After all the racks 17 have completed their strokes under the action of the shoulders 42, the cams 40 are rocked further in the direction of the arrow 48, causing the racks 17 to be moved further downwards by their engagement with the shoulders 43. If during the preceding motion any tens were carried and consequently any of the catches 34, 35, 36 was depressed into the notch 30 of the corresponding initiating arm 19, as shown at the catch 36 in the upper part of Fig. 1, the lower edge 50 of the catch 36 depressed is at a lower level than the lower edges 51, 52 of the other catches 34, 35. As stated above, in the normal position of the catches said lower edges are on a level with the upper end of the slot 39, said end coinciding with the uppermost position of the shaft 7 in relation to the slide 17. Thus, during the continued downward motion of the slide 17 the lower edge 50 of the depressed catch 36 will strike on the shaft 7 which lifts said catch, thus disengaging it from the notch 39 of the initiating arm 19. Then the spring 28 restores said arm 19 until it is checked by the offset 33, when it engages the shoulder 29. Now the initiating device is ready for the next tens transfer. Thereafter the cams 40 are in well-known manner restored to their zero position and the slides 17 are restored by the springs 47.

It is important that the spring 21 between the arms 19 and 20 renders it possible for each arm 20 to snap yieldingly into its operative position above the corresponding offset 19a. For this reason the arms 19 and 20 may be placed on the same shaft 18, as shown. For the same reason it is also possible to arrange the initiating and carrying arms 19, 20 for several different totalizers on one and the same tens carrying member, i. e. the slide 17. For this reason the device in accordance with this invention is much less complicated than the tens carrying mechanism heretofore known, much less bulky, has fewer movable parts and is consequently less expensive and more safe and reliable in operation.

Referring now to Figs. 10-20 of the drawings, it may be first mentioned that those parts in Figs. 10-20 which correspond to similar parts in Figs. 1-9 carry the same reference characters.

In the embodiment shown in Figs. 10-20 the swingable tooth-carrying arm 10 has an offset 10f on which a locking arm 10b (see especially Fig. 19) is rotatably journaled on a pin 10c. A torsional spring 10d engages with one end a bent-out projection 10e of the offset 10f and with its other end a bent-out portion 10a of the locking arm 10b to press the latter inwards to the rack 5. On account of this a second bent-out offset 10g of the locking arm 10b is normally pressed into a slot 16a of the portion 16 cut away. For this reason, said locking arm and consequently also the arm 10 carrying the tooth 14 is locked in its normal position (position of rest) and cannot move downwards in relation to the setting rack 5. The tooth 14 is consequently locked and acts as a fixed tooth.

When the cut-away portion 16 passes by the wheel 1 (then in operative position), only the single tooth 14 meshes in a certain moment with said wheel 1, but also then the rack 5 and said wheel are still positively in mesh, both when the setting rack 5 is moved downwards (for cash registering or calculating operations) or upwards (for resetting).

The initiating arms 19 (see especially Figs. 14 and 15) are journalled on pins 18 on the tens carrying racks 17. At its central part 23 each arm 19 is bent at right angles to form walls 24, 25, each having one hole for the shaft 18. In the central part 23 a hole 27 is made for one end of a spring 28. The wall 25 is provided with two notches 29, 30, while the wall 24 has a hook 32.

The initiating arms 19 are kept in their normal position by the springs 28, one end of which is attached to the holes 27. The other ends of said springs are secured to offsets 33 of three catches 34', 35', 36', one for each initiating arm 19, i. e. one for each totalizer wheel. Said catches are swingably journalled on pins 38 secured to the slides 17 and normally engage the notches 29 of the initiating arms 19 and are retained therein by the springs 28, which thus simultaneously keep both the arms 19 and the catches 34', 35', 36' in position.

To the shaft 41 cams 40 are rigidly secured, one for each rack 17, each of said cams having a shoulder 42. The shoulders 42 are in well-known manner displaced a certain angle in relation to each other, as shown in Fig. 10. In addition, each cam 40 has a pin 43a and the pins 43a are angularly displaced in a similar manner. To the cams 40 a rocking motion is imparted, first in the direction of the arrow 48 and then back to the position of rest as described above in connection with Figs. 1-9.

On each tens carrying slide 17 also a restoring slide 60 (Fig. 10) is slidably arranged, pins 61 of slide 17 engaging slots 62 of said slide 60. The upper part of said slide 60 is bent to a bridge 60a across the catches 34' and 35' and said slide has three projections 63 at the catches 34', 35', 36,' respectively. Said projections are normally somewhat below the respective catches. Below the slide 60 a pin 64 is secured to each slide 17 and on said pin two arms 65, 66 are journalled. Said arms are rigidly interconnected and form a sort of bell-crank lever. A weak torsional spring 67 presses the arm 66 to engage the lower side of the slide 60. One end of said spring engages the edge of the slide 17 and its other end engages a bent-out portion of the arm 66. Said spring is so dimensioned that it cannot lift the slide 60 and has for its single purpose to rotate the light pair of arms 65, 66 to engage the lower side of said slide 60.

The device described acts as follows:

When a key is depressed, the corresponding rack 5 is released in well-known manner, as described above in connection with Figs. 1-9, and is during the running of the machine moved upwards to a position corresponding to the numeral value of the key depressed. During this motion the totalizers are disengaged. Thereafter the numeral wheels 1 are brought into engagement with the setting racks 5 in the usual manner and said racks are restored to their position of rest (zero position) driving the corresponding wheel as many pitches forwards as is indicated by the numeral values of the respective keys depressed. If then a wheel 1 is rotated from the number "9" to the number "0", its tens carrying tooth 49 passes by the initiating arm 19, rocking it down to the position shown at the uppermost right-hand totalizer (at 3) of Fig. 10. Simultaneously the corresponding catch, in this case 36, for the totalizer on the shaft 3, snaps into the notch 39 of the wall 25 with its offset 33 under the action of the spring 28 and retains the initiating arm 19 in its new position. When an initiating arm 19 has been rocked, its wall 24 with the hook 32 lies above the offset 10a of the locking arm 10b of the swingable arm 10, after the setting rack 5 has been returned to its zero position, as shown in Figs. 13 and 20.

During the rocking of the arm 19 the edge 24a of its wall 24 engages the offset 10a of the locking arm 10b and rocks it out of its normal position. Thus, the offset 10g is disengaged from the slot 16a; and the arm 10 carrying the tooth 14 is now free to be rocked downwards for carrying the tens.

If a tens transfer is initiated, while the setting rack is still moving downwards, the wall 24 with its hook 32 will be in the path of offset 10a of locking arm 10b, but the said arm 10b yields while setting the spring 10d and the offset 10a again snaps in below the hook 32, after it has passed by the latter. Thereafter, the locking arm is retained in its disengaged position, its offset 10a engaging the edge 24a of the wall 24 rocked to its operative position. Thus, the tens transfer is prepared by the rocking of the hooks 32 to their operative positions as a result of the action of the tens carrying tooth 49 on the arm 19, when a ten is to be carried. (In Fig. 10, a section through the arm 19, is shown at the left totalizer; said arm rocked out to its operative position, i. e. initiated for carrying the tens, is shown at the upper right-hand totalizer and said arm 19 in its normal position is shown at the lower right-hand totalizer.)

For carrying the tens the slides 17 are moved separately downwards beginning with that which corresponds to the lowest denomination, by the action of the shoulders 42, as described above.

If now a tens transfer has been initiated and consequently an initiating arm 19 has been moved with its hook 32 to its carrying position, as described above, the hook 32 will, during the downward motion of the slide 17, engage the upper edge of the offset 10a of the locking arm 10b, now rocked out of its locking position. The tooth-carrying arm 10, which is now free, is thus pushed one pitch downwards and the tooth 14 of said arm rotates the wheel 1 one step forwards, thus completing the tens transfer. If during such transfer a tens transfer should be initiated on the numeral wheel of the next higher denomination, it is obvious from the foregoing description that this is quite possible, because the hook 32 of the arm 19 is then moved inwards directly above the upper side of the offset 10a for the rack 5 of the next higher denomination, so that said offset 10a by the tens transfer slide 17 of the next higher denomination is pushed downwards, when said latter slide afterwards moves downwards. After the tens transfer has been completed, the totalizers are disengaged.

During the rotation of the cams 40 in the direction of the arrows 48 to effect a tens carrying, the pins 43a strike on the arms 65, but then the pairs of arms 65, 66 only yield and are afterwards restored by the springs 67, causing the arms 66 to engage the lower sides of the slides 60 again. When afterwards the cams 40 return to their normal position, moving in the direction opposite to that indicated by the arrow 48 the pins 43a will strike on the lower sides of the corresponding arms 65, Fig. 10, to cause the arms 66 to lift the restoring slides 60. If tens have been carried during the preceding motion and consequently one or more of the catches 34', 35', 36' have been drawn down into the notch 30 of the corresponding initiating arm 19, the catch 36' in Fig. 10 being shown in such position, the catch 36' thus drawn down will be lifted by the slide 60 and consequently disengaged from the notch 30 of the initiating arm 19. Then the spring 18 restores said arm 19 until it is checked by the offset 33 when it engages the notch 29. Now the initiating device is ready for the next tens transfer. Thereafter the slides 60 are restored to their zero position (lower position), for instance, by gravity and the slides 17 are restored by the springs 47. Simultaneously the arms 14 pushed down are restored by their springs 12 to their upper positions and their locking arms 10b are restored by the action of the springs 10d to their normal position to lock the teeth 14. If desired, the racks 5 may now be used for resetting one or more of the totalizers, in well-known manner.

The spring 10d between the arm 10f and the locking arm 10b renders it possible for said arm 10b to be rocked yieldingly into the path of the hook 32. For this reason, it is possible to arrange the initiating arms 19 for several different totalizers on one and the same tens carrying member, i. e. slide 17.

In the embodiment shown in Figs. 1–9 the movable tooth 14 is not locked in its normal position at 15. In those types of cash registers or calculating machines which either have no resetting device or are reset without use of the setting racks, this is no drawback. If however, the totalizer or totalizers (together with the indicators, if any) are to be reset by use of said setting racks, the embodiment of Figs. 10–20 should be used. For resetting, said racks are generally moved in the direction opposite to that used for the registering or calculating operations.

The types of catches 34, 35, 36, 34', 35', 36' in both embodiments are alternatives and either type may be used in combination with the other elements. Similarly, the catch restoring devices as in either embodiment may be used in combination with the other elements.

It is obvious that the device described having a movable single tooth may be used even if the setting members are not constituted by straight racks but by rockable rack sectors. In the embodiment shown the tooth 14 is swingable, but it may also be slidable. The invention may be applied to one single or any arbitrary number of totalizers operable by the same set of setting members. In such case, two or more totalizers may be arranged one after the other along the same row of teeth of the setting member. It is to be observed that on the same side of the setting member, i. e. at the same row of teeth, two independent totalizers may be placed at a distance from each other less than nine pitches thus rendering a very compact construction of the machine possible.

In my copending applications, Serial Nos. 140,520 and 140,521, filed May 3, 1937, certain features of the present disclosure are claimed and all rights thereto are fully reserved.

What I claim is:—

1. In a carrying mechanism for cash registers, calculating machines and the like, having a setting member provided with a row of fixed teeth and having a recess formed by the omission of two teeth from said row, a totalizer movable into and out of engagement with said setting member, a movable single tooth on said setting member at said recess of said setting member, the two teeth omitted being those which in the zero position of said setting member are just opposite the corresponding totalizer wheel, and means for moving said single tooth substantially in the direction of the pitch line of said fixed teeth and in relation to them for carrying operations, while in engagement with said totalizer.

2. In a carrying mechanism for cash registers, calculating machines, and the like, having a setting member provided with a row of fixed teeth, a totalizer movable into and out of engagement with said setting member, said setting member having a recess formed by the omission of two teeth of said row, the two teeth omitted being those which in the position of rest of said setting rack are at most one pitch from the radius from the center of the totalizer wheel shaft at right angles to the pitch line of the teeth of the setting member, a single tooth movable in relation to said fixed teeth and substantially in the direction of the pitch line of said fixed teeth to at least two main positions on said setting rack, for carrying the tens during an interval, in which said rack remains stationary, and means for moving said single tooth from one of said main positions corresponding to the space left by the omission of one of the omitted teeth to the other main position corresponding to the space left by the omission of the other omitted tooth, so as to move the totalizer wheel still in engagement one unit forward.

3. A cash register, adding, listing and other calculating and accounting machine, having a movable toothed setting member provided with a space formed by the omission of two of the teeth, at least two totalizers of the decimal system with carrying teeth and wheels, which are adapted to be operated by and also disconnected from said setting member, said totalizers being arranged at the same row of teeth of said setting member and at a distance from each other less than ten pitches of said teeth, comprising, in combination, for each totalizer, a single carrying tooth on said setting member at the space formed by the omission of those two teeth of said setting member, the teeth omitted from said setting member being those which in the zero position of said setting member would be in either of the following positions, viz. one coinciding with the radius from the center of the totalizer wheels at right angles to the pitch line of the teeth of said setting member and the other on either side of said radius, including all positions therebetween, and means for moving said single tooth for carrying operations while in engagement with the appertaining totalizer wheel and while said setting member remains in its position of rest.

4. A device as claimed in claim 1, in which said single movable tooth is rockably journalled on a pin on said setting member.

5. A carrying mechanism for cash registers, adding, listing and other computing and accounting machines, having a movable setting member provided with a row of teeth and a totalizer with wheels and carrying teeth, the wheels of said totalizer being adapted to be operated by and disconnected from said setting member, comprising, in combination, a single tooth on said setting member at a gap formed by the omission of the two teeth of said setting member which in the zero position of said setting member are just opposite and most close by the corresponding totalizer wheel, said single tooth being movable for carrying operations substantially in the direction of the pitch line of said toothed setting member, while said setting member remains in its position of rest, a slide movable beneath an adjacent setting member, means for moving said slide, a pin on said slide, and cooperating initiating and carrying arms on said pin in the path of one of said carrying teeth of said totalizer wheels and adapted to move said single tooth, while in engagement with the appertaining totalizer wheel, for carrying tens from one totalizer wheel to the totalizer wheel of the next higher denomination.

6. A carrying mechanism for cash registers, adding and other calculating and accounting machines, having a movable setting member having a series of teeth and having a gap in said series formed by the omission of two teeth of said series, a totalizer with toothed wheels having carrying teeth, and means for coupling said totalizer to and disengaging it from said setting member, comprising, in combination, a movable single tooth on said setting member at the gap formed by the omission of said two teeth thereof, the teeth omitted from said series being those which in the position of rest of said setting member are just opposite to and closest by the corresponding toothed wheel, means for locking and unlocking said single tooth in one of its positions, and means for moving said movable single tooth substantially in the direction of the pitch line of said toothed setting member while said single tooth is in engagement with the appertaining totalizer wheel to carrying operations in dependence of the rotation of the totalizer wheel of the next lower denomination and its carrying tooth, when said single movable tooth is unlocked, said setting member remaining unmoved during the carrying motion of said single tooth.

7. A carrying mechanism for cash registers, adding and other computing and accounting machines, having a movable setting member provided with a series of teeth having a gap formed by the omission of two teeth from said series, a totalizer with toothed wheels having carrying teeth, and means for coupling said totalizer to and disengaging it from said setting member, comprising, in combination, a movable single tooth on said setting member at the space formed by the omission of said two teeth of said series, the omitted teeth being those which in the position of rest of said setting member would be just opposite to and closest by the corresponding toothed wheel, a locking member for said single movable tooth, and means for putting said locking member out of operation and moving said single movable tooth to a carrying operation, while said single tooth is in engagement with the appertaining totalizer wheel, in dependence of the rotation of the totalizer wheel of the next lower denomination, while said setting member remains in its position of rest.

8. A machine as claimed in claim 7, in which said locking member consists of a locking arm, which is arranged on an arm carrying said movable single tooth and is normally pressed by a spring into a recess in said setting member.

9. In a cash register or other accounting machine, a movable setting member having a series of teeth provided with a gap formed by the omission of two teeth of said series, a totalizer having toothed wheels with carrying teeth, means for coupling said totalizer to and disengaging it from said setting member, a movable single tooth on said setting member at the gap formed by the omission of said two teeth of said setting member, the two teeth omitted being those which in the position of rest of said setting member would be just in front of and next to the corresponding toothed wheel, a carrying slide movable beneath and in relation to said setting member, an initiating arm on said slide in the path of rotation of the carrying tooth of the totalizer wheel of the next lower denomination, a locking arm for said single movable tooth in the path of motion of said initiating arm, and means for moving said slide to and fro to cause said initiating arm to move said single movable tooth in carrying operations from a totalizer wheel to the totalizer wheel of the next higher denomination.

10. In a cash register or other accounting machine, a movable setting member having a series of teeth provided with a gap formed by the omission of two teeth of said series, a totalizer having toothed wheels with carrying teeth, means for coupling said totalizer to and disengaging it from said setting member, a movable single tooth on said setting member at the gap formed by the omission of said two teeth of said setting member, the two teeth omitted being those which in the position of rest of said setting member would be just in front of and next to the corresponding toothed wheel, a carrying slide at said setting member and movable in relation to said setting member, an initiating arm on said slide in the path of rotation of the carrying tooth of the totalizer wheel of the next lower denomination, a locking arm for said single movable tooth in the path of motion of said initiating arm, an offset on said initiating arm, and means for reciprocating said slide to cause said offset to actuate said single movable tooth in carrying operations during the interval, in which said toothed setting member remains in its position of rest.

11. In a cash register or other accounting machine, a movable setting member having a series of teeth provided with a gap formed by the omission of two teeth of said series, a totalizer having toothed wheels with carrying teeth, means for coupling said totalizer to and disengaging it from said setting member, a movable single tooth on said setting member at the gap formed by the omission of said two teeth of said setting member, the two teeth omitted being those which in the position of rest of said setting member would be just in front of and next to the appertaining toothed wheel, a carrying slide movable at and in relation to said setting member, an initiating arm on said slide in the path of rotation of the carrying tooth of the toothed wheel of the denomination next lower to that of said appertaining toothed wheel, a locking arm for said single movable tooth in the path of motion of said initiating arm, a catch for retaining said initiating arm in its operative and inoperative positions, respectively, means for moving said slide to and fro to bring said initiating arm to move said single movable tooth for tens carrying operations, and a reciprocated restoring slide for said catches.

12. In a cash register or other accounting machine, a movable setting member having a series of teeth provided with a gap formed by the omission of two teeth of said series, a totalizer having toothed wheels with carrying teeth, means for coupling said totalizer to and disengaging it from said setting member, a movable single tooth on said setting member at the gap formed by the omission of said two teeth of said setting member, the two teeth omitted being those which in the position of rest of said setting member would be just in front of and next to the appertaining toothed wheel, a carrying slide at said setting member and movable in relation to it, an initiating arm on said slide in the path of rotation of the carrying tooth of the toothed wheel of the next lower denomination, a locking arm for said single movable tooth in the path of motion of said initiating arm, a catch for retaining said initiating arm in its operative and inoperative positions, respectively, a power-driven cam for reciprocating said slide to bring said initiating arm to move said single tooth for tens carrying operations, a restoring slide for said catch, and an additional offset on said cam for actuating said restoring slide, after the tens have been carried.

13. A machine as claimed in claim 12, in which said additional offset is displaced angularly in relation to the additional offset for another denomination.

14. In a cash register or other accounting machine, a movable setting member having a series of teeth provided with a gap formed by the omission of two teeth of said series, a totalizer having toothed wheels with carrying teeth, means for coupling said totalizer to and disengaging it from said setting member, a movable single tooth on said setting member at the gap formed by the omission of said two teeth of said setting member, the two teeth omitted being those which in the position of rest of said setting member would be just in front of and next to the appertaining toothed wheel, a carrying slide at said setting member and movable in relation to it, an initiating arm on said slide in the path of rotation of the carrying tooth of the toothed wheel of the denomination next lower than that of said appertaining toothed wheel, a locking arm for said single movable tooth in the path of motion of said initiating arm, a catch for retaining said initiating arm in its operative and inoperative positions, respectively, a power-driven cam for reciprocating said slide to bring said initiating arm to move said single tooth for tens carrying operations, a restoring slide for said catch, a bell crank lever journalled on said carrying slide, an offset on said cam for actuating said bell crank lever, and a spring pressing said bell crank lever to engage said restoring slide, said spring being too weak to displace said restoring slide.

HANS FREDRIK BIRGER HÖGFORS.